United States Patent
Rabins et al.

(10) Patent No.: US 10,423,392 B2
(45) Date of Patent: Sep. 24, 2019

(54) SYSTEMS AND METHODS FOR TRANSACTIONAL APPLICATIONS IN AN UNRELIABLE WIRELESS NETWORK

(71) Applicant: Alpha Software Corporation, Burlington, MA (US)

(72) Inventors: Selwyn Rabins, Lexington, MA (US); Daniel Bricklin, Newton Highlands, MA (US)

(73) Assignee: Alpha Software Corporation, Burlington, MA (US)

( * ) Notice: Subject to any disclaimer, the term of this patent is extended or adjusted under 35 U.S.C. 154(b) by 0 days.

(21) Appl. No.: 15/903,402

(22) Filed: Feb. 23, 2018

(65) Prior Publication Data

US 2018/0246704 A1 Aug. 30, 2018

Related U.S. Application Data

(63) Continuation of application No. 15/098,634, filed on Apr. 14, 2016, now abandoned.

(60) Provisional application No. 62/147,736, filed on Apr. 15, 2015.

(51) Int. Cl.
| | |
|---|---|
| *G06F 8/34* | (2018.01) |
| *G06F 8/65* | (2018.01) |
| *H04W 56/00* | (2009.01) |
| *H04W 4/50* | (2018.01) |
| *G06F 16/27* | (2019.01) |
| *G06F 17/30* | (2006.01) |

(52) U.S. Cl.
CPC ............... *G06F 8/34* (2013.01); *G06F 8/65* (2013.01); *G06F 16/273* (2019.01); *H04W 4/50* (2018.02); *H04W 56/0015* (2013.01)

(58) Field of Classification Search
CPC .... G06F 8/34; G06F 8/65; G06F 8/71; H04W 4/001; H04W 4/50; H04W 56/0015
USPC ........................................................ 717/107
See application file for complete search history.

(56) References Cited

U.S. PATENT DOCUMENTS

| | | | |
|---|---|---|---|
| 5,926,816 A | * | 7/1999 | Bauer et al. .......... G06F 16/273 |
| | | | 709/248 |
| 7,899,917 B2 | | 3/2011 | Chitre et al. |
| 7,966,426 B2 | | 6/2011 | Smith et al. |

(Continued)

OTHER PUBLICATIONS

Bricklin, "Dealing with Disconnected Operation in a Mobile Business Application: Issues and Techniques for Supporting Offline Usage;" The Offline Problem; Essay Retrieved on Aug. 18, 2014 from <http://www.bricklin.com/offline.htm>; 11 Pages.

(Continued)

*Primary Examiner* — Wei Y Zhen
*Assistant Examiner* — Mohammed N Huda
(74) *Attorney, Agent, or Firm* — Daly, Crowley, Mofford & Durkee, LLP

(57) ABSTRACT

A system for building and deploying transactional applications in an unreliable wireless network environment may include a low-code environment and an application server. A generated transactional application may include controls that allow a user to make changes in offline mode, and mechanisms to synchronize offline changes with the application server. The application server may process synchronization requests and detect write conflicts. A generated transactional application may include additional controls to allow a user to resolve write conflicts.

23 Claims, 9 Drawing Sheets

(56) References Cited

U.S. PATENT DOCUMENTS

| | | |
|---|---|---|
| 8,494,888 B2 | 7/2013 | Koronthaly et al. |
| 9,230,000 B1 * | 1/2016 | Hsieh et al. ...... G06F 17/30575 |
| 2004/0139235 A1 | 7/2004 | Rashid et al. |
| 2004/0205068 A1 | 10/2004 | Iyer et al. |
| 2006/0161516 A1 | 7/2006 | Clarke et al. |
| 2009/0037492 A1 * | 2/2009 | Baitalmal et al. ...... H04L 67/34 707/201 |
| 2009/0070388 A1 | 3/2009 | Kolke et al. |
| 2012/0136839 A1 | 5/2012 | Eberlein et al. |
| 2013/0262626 A1 | 10/2013 | Bozek et al. |
| 2017/0031661 A1 | 2/2017 | Rabins et al. |

OTHER PUBLICATIONS

Alpha Software, "Details on the Upcoming Robust Alpha Anywhere Offline Capabilities;" Building Disconnected Applications; Blog Entry dated Aug. 23, 2014 Retrieved from <http://www.alphasoftware.com/blog/>; 86 Pages.

Alpha Software, "Building Disconnected Applications;" Release Notes for Alpha Anywhere (Alpha Five Version 12); Retrieved on Oct. 8, 2014; 39 Pages.

Office Action for U.S. Appl. No. 15/098,634 dated Nov. 22, 2017; 52 pages.

\* cited by examiner

| CUSTOMER ID | FIRSTNAME | LASTNAME | COMPANY | BILL CITY | BILL STATE... |
|---|---|---|---|---|---|
| 25 | Michael | Phillips | | New York | NY |
| 51 | Ronald | Carr | | Purchase | NY |
| 52 | Tom | Barber | Barberszon, Inc | Brooklyn | NY |
| 54 | Jeffrey | Bernstein | | New York | NY |
| 56 | John | Baker | | Harrisburg | NY 432 |
| 58 | Thomas | Harris | Alpha | Latham | NY 436 |
| | Frank | Russo | | Ithaca | NY |

*FIG. 4B*

SYSTEMS AND METHODS FOR TRANSACTIONAL APPLICATIONS IN AN UNRELIABLE WIRELESS NETWORK

CROSS REFERENCE TO RELATED APPLICATION

This application is a continuation of co-pending U.S. application Ser. No. 15/098,634 filed Apr. 14, 2016 which claims the benefit under 35 U.S.C. § 119(e) of U.S. Provisional Application No. 62/147,736 filed Apr. 15, 2015, both of which are incorporated herein by reference in their entireties.

BACKGROUND

As is known in the art, mobile application software (also sometimes referred to as a "mobile application" or more simply a "mobile app") is a computer program designed to execute on a mobile processing platform such as a smart phone, tablet computer or other mobile devices. In a setting in which a mobile application executing on a mobile device is used within the context of an organization, the mobile application is typically connected to resources of the organization (e.g. organization databases) through a wireless network.

One concern for designers of mobile applications is how such an application operates when "disconnected from" (i.e. is without access to) the network. This problem is particularly acute for mobile applications (e.g. mobile business applications) in which multiple users operate on common data records (e.g. such as might be stored in a database) and transactional semantics must be enforced to ensure data integrity in the database. Current solutions require complex logic to be added in a custom, per-application manner thereby making it relatively expensive (and in some cases prohibitively expensive) for businesses to develop new, or transition existing, internal applications to mobile devices.

As demand for mobile applications has increased, enterprises are now confronted with how they will start taking advantage of mobile devices for internal use. There are large corporations that have hundreds, thousands, and even tens of thousands of Microsoft Access applications in use, targeted at non-mobile devices, and having minimal (or no) web support. In-house developers, often in the best position to understand employee needs, may be comfortable with environments like PHP, Microsoft Access, Visual Basic, Filemaker, etc., however they may not be skilled in the latest computer languages and techniques, such as mobile applications built using Objective-C, Java for Android, or even HTML5 and JavaScript. Outsourcing mobile application development is often cost-prohibitive to small and medium-sized businesses.

One factor that appears to be slowing the development and deployment of mobile business application software is the need to support frequent or intermittent offline operation. Unlike traditional browser-based business application software, which is generally always connected to a shared database (perhaps via an application server), mobile applications frequently have to operate without a network connection and without the ability to immediately update or query the database. Network connections may not be available for a number of reasons including, for example, dropped connections in cellular networks or a device being located outside the cellular network coverage area (i.e., within a "dead zone").

Corporate software developers are finding that a significant percentage of mobile applications require offline operation at least some of the time. Several issues arise in the development of such applications. For example, when a user makes changes to records stored in a database to which the user is connected through the mobile application, those changes must be preserved until they can be synchronized with the database. This includes being able to maintain changes through interruptions in running the mobile application (such as making a phone call, consulting a mapping app, or showing a presentation to a customer), as well as situations such as the mobile device losing power (e.g. due to battery discharge). The time between a user making a change and the change being synchronized to the database is potentially very long.

A common strategy for synchronizing data is to keep a replica of the database system on the mobile device. The application can then be written in the same manner as it would be if it was connected to a shared database over a constant network connection, but instead use the local database. Other software, part of the local and shared databases, takes care of automatically synchronizing the contents of the two at those times when a connection does exist. Most of the code needed to do the synchronization is separate from the application and need not be of much concern to the mobile application developer. The same syncing database may be able to be used for multiple applications, depending upon the deployment system. An issue, though, is that the local database may need to have additional information about the data it is maintaining so that it can validate new data being stored and communicate validation errors back to the mobile application at the time of data entry. Another issue with using an intermediate database arises when the database is in a different form than the corporate database. It would be necessary to provide additional intermediate code on the server (or between servers) to synchronize the database that connects to the client with the backend corporate database.

A different strategy for dealing with disconnected operation is to have the mobile application itself keep track of database operations, such as creating or updating records; this strategy is referred to herein as "deferred updating." When data is needed from the database, or an operation is to be committed to the database, and if the connection is active, the database is accessed through the connection to the server and things work normally. If the connection is not active, then the application makes use of data that it has cached from the server and the application keeps track of changes to be made, queuing those changes up for future connections to the server. When the connection becomes active again, the deferred changes are sent to update the database through the server, and new data is downloaded if needed.

SUMMARY

In accordance with the concepts, systems and techniques described herein, it has been recognized that a disadvantage of the deferred updating method is that there is a lot of extra, custom code that needs to be present in the application, as well as code on the server, including code to deal with error status. For hand-coded systems this can be a time-consuming, tedious, and error-prone addition to development, especially during early prototyping and concept testing. An example of a situation that is complex to code is with transactions that affect multiple tables in a database. This could be customer information with different orders and different line items in each order. New orders need new identifiers to tie them to their line items, and there could be various conditions that are tested for on the server that could result in a rollback of some or all of the transaction. The user would need to be notified of the situation and possibly be able to remedy it.

Another issue with mobile business application is handling updates to data that come from the server (e.g., updates by other users). In a traditional web application, the entire displayed dataset can be updated with each transaction. In an offline situation, there may be a much larger amount of data that is cached, much of that perhaps not displayed except on demand. When synchronization is performed, it is often desirable to update all of the information, including cached data, not just sending changes from client to server (i.e., two-way synchronization is desirable). For bandwidth and other reasons, reloading all of the cached data may be impractical and only incremental changes should be transmitted. This may necessitate different data organization or other techniques not needed in a traditional web or desktop application. For example, the server may need to keep track of what data it thinks is on each device or the client will need to give the server some way to figure that out. There is also the user interface challenge of letting the user be aware of updates that may be of importance to them, much like "unread" messages in email.

In business applications, data loss should be minimized and ideally prevented and, in the case where data loss is dependent on user behavior, the user should be made aware of the situation. Well-designed applications can protect changes the user makes on the mobile device up until the time when those changes are synchronized to the shared database. However, if the user is unaware that pending changes are stored only on their device, the user could neglect to allow synchronization, take actions before synchronization that are contingent upon that synchronization or on its success, or delete the data from their device. When synchronization does occur, any errors, especially those that need to be dealt with in a timely fashion should be brought to the user's attention.

In addition to client/server data synchronization issues, it may be a requirement that a user can launch the mobile business application in offline mode. This requires caching not only application data on the mobile device, but also application content itself. In contrast, traditional web pages are typically designed to be reloaded from a server, even if intermediary data is persisted in temporary storage, such as using cookies or other means. Another type of persistence often required by business applications is returning the user interface to the proper state when a mobile application is restarted. For example, it may be desirable to return to the most recent location within the application, to restore partially completed forms after a restart, and otherwise restore the application state.

These issues have implications for user interface (UI) and user experience (UX) design. Appropriate status information needs to be worked into the display of data, and appropriate flow of use may need to take the needs of offline operation into account. They can require a lot of specialized code and reworking of tightly crafted screens if not part of the overall framework. Adding them at the end can result in a poor user interface or a large amount of recoding and delay in completion.

Therefore, it would be desirable to provide a system for building and deploying transactional applications in an unreliable wireless network environment, the system including a low-code environment and an application server. The low-code environment comprises a UX builder configured to: present available components to a developer; enable the developer to select a component from the available components, the selected component comprising a list control; enable the developer to configure a data source and a synchronization policy for the list control; generate a page definition using at least the selected component, data source, and synchronization policy; and store the page definition to non-volatile memory. The low-code environment further includes an application server configured to: in response to receiving a synchronization request from a mobile device, the synchronization request comprising first user changes, compare the first user changes to data within the database to detect a write conflict with second user changes, and return information about the write conflict and the second user changes to the mobile device; and in response to receiving a content request from the mobile device, render a page using the stored page configuration and return the rendered page to the mobile device. The rendered page comprises: a list view to display a plurality of data records and to enable a first user to select a data record from the plurality of data records; a detail view to display the selected data record to the first user, to enable the first user to change fields of the selected data record, and to store the first user changes to a local storage device upon the mobile device; a synchronization module to send a synchronization request to the application server according to the synchronization policy, the synchronization request including the first user changes, and to receive the information about the write conflict and the second user changes; and a conflict resolution control integrated into the detail view to provide to the first user options for resolving the write conflict, at least one of the options to accept the first user changes, at least one options to accept the second user changes, wherein in response to the first user selecting the option to accept the first user changes, the first user changes are committed to the database.

In some embodiments, the system further includes a mobile device coupled to the application server via an unreliable wireless network, the mobile device comprising: a wireless network adapter; a display device to display; a user input device; the local storage device; and an application container operatively coupled to the wireless network adapter, the display device, the user input device, and the local storage device, the application container to send a content request to the application server to request the rendered page, the application container to display the rendered page to the first user via the display device.

In certain embodiments, the first user changes include old values and new values for the changed fields, wherein the conflict detection module compares the old values to data within the database to detect a write conflict.

In various embodiments, the database comprises a relational database, wherein the data source comprises a table name and column names within the relational database. The first user changes may comprise hierarchical data, wherein in response to receiving the synchronization request from a mobile device, the application server converts the hierarchical data to relational data.

In some embodiments, the UX builder is further configured to enable the developer to configure a refresh policy for the list control, wherein the UX builder generates the page definition further using the refresh policy; wherein the application server is further configured to, in response to receiving a refresh request from the mobile device, the refresh request comprising a plurality of checksums, retrieve updated data records from the database using the plurality of checksums, and send the updated data records to the mobile device; and wherein the synchronization module is further configured to send the refresh request to the application server according to the refresh policy, the refresh request including the plurality of checksums, and to update the list view based upon the updated data records.

In particular embodiments, the UX builder is further configured to enable the developer to configure default search criteria for the list control, wherein the UX builder further generates the page definition using the default search criteria; and the application server retrieves the updated data records further using the default search criteria.

In certain embodiments, the UX builder is further configured to enable the developer to configure a conflict resolution policy for the list control, wherein the UX builder further generates the page definition using the conflict resolution policy; and wherein, in response to receiving the synchronization request from a mobile device, the application server detects the write conflict based upon the conflict resolution policy.

In some embodiments, the low-code environment further comprises a tool to store the rendered page to non-volatile memory as a pre-rendered page; and wherein, in response to receiving a pre-rendered content request from the mobile device, the application server returns the pre-rendered page to the mobile device.

In various embodiments, the stored page configuration includes server-side scripting instructions, and wherein, in response to receiving the content request from the mobile device, the application server evaluates the server-side scripting instructions.

BRIEF DESCRIPTION OF THE DRAWINGS

The concepts, structures, and techniques sought to be protected herein may be more fully understood from the following detailed description of the drawings, in which:

FIGS. 4A-4C are diagrams of an illustrative transactional application for use within the mobile device of FIG. 2.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. As used herein, the terms "low-code development system" and "low-code environment" are used to describe a complete, prototype-to-production system (including both hardware and software) for rapidly developing and deploying user applications. Examples of user applications that may be developed/deployed using a low-code environment include enterprise-level applications, cross-platform applications, and mobile applications. In one example, a low-code environment may be used to develop/deploy web business applications using HTML5 technologies. A low-code environment typically includes a visual (i.e., non-line-by-line-code) interface for specifying an application (e.g., dialog boxes, tree controls, drag-positioning, etc.). A low-code environment can be used to develop both front-end and back-end application software components. Also, a low-code environment includes programmer-friendly facilities for integrating custom code written in common, familiar computer languages, such as JavaScript, Cascading Style Sheets (CSS), Structured Query Language (SQL), and)(Basic.

The term "unreliable wireless network" is used herein to refer to a wireless network wherein there is a relatively high probability that one or more nodes may be temporarily disconnected from the network (either intentionally or not). A cellular network is an example of an unreliable wireless network because the nodes (i.e., cellular devices) can become disconnected as a user moves around geographically. A node/device is said to be "offline" when disconnected from the network.

As used herein, the terms "database record" (or more simply "record") refer to a logical or physical grouping of data values. The data values may correspond to attributes (or "fields") of the record. In a relational database system, records may correspond to table rows, and attributes/fields may correspond to table columns.

Figure 1:
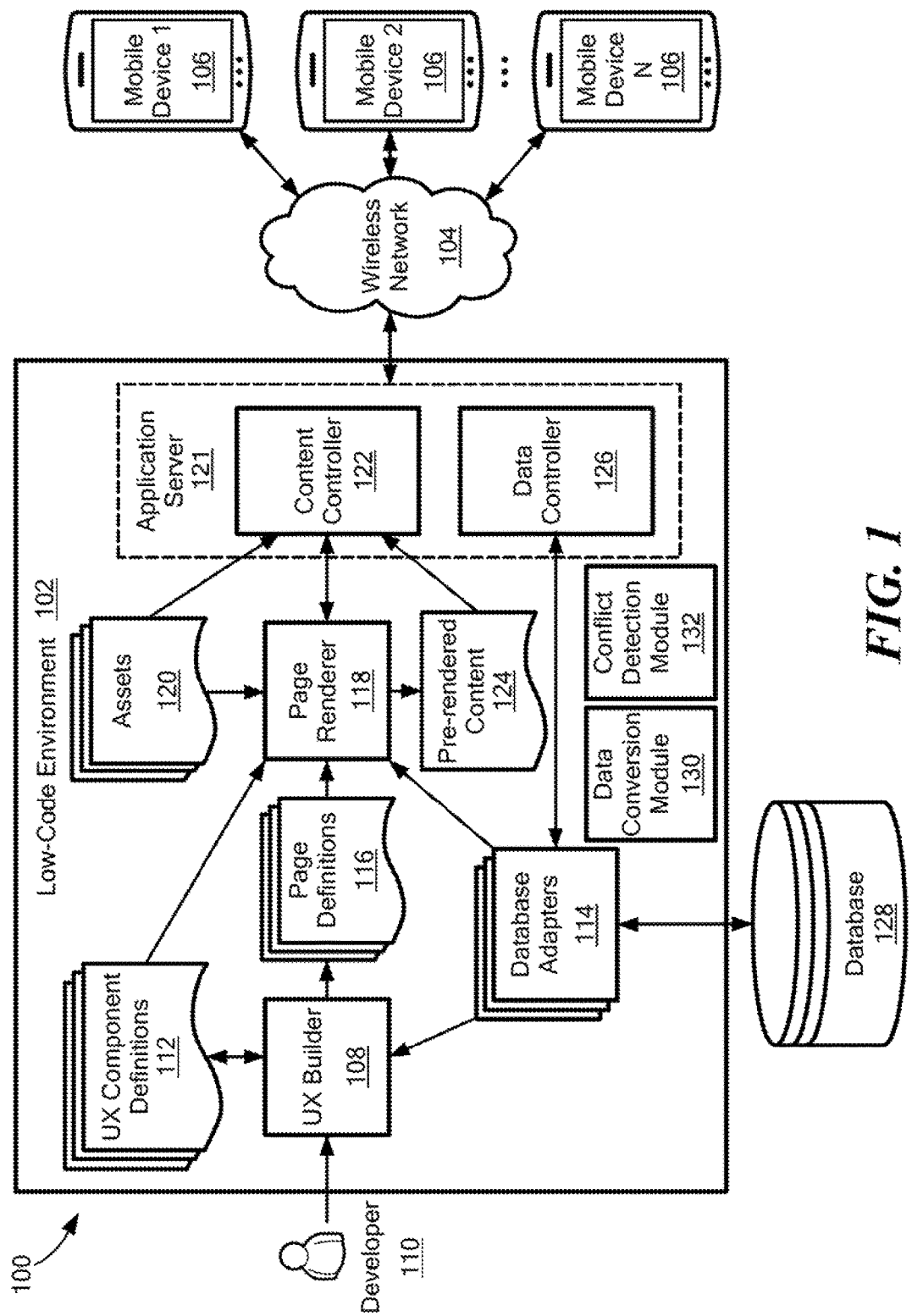
FIG. 1 is a block diagram of a system comprising mobile devices connected to a low-code environment via an unreliable wireless network.

Referring to FIG. 1, a system 100 for transactional applications in an unreliable wireless network environment may include a plurality of mobile devices 106 coupled to a low-code environment 102 via an unreliable wireless network 104. Mobile devices 106 may be, for example, any device capable of performing a processing function including, but not limited to mobile phones, smart phones, tablet computers, laptop computer, or any other suitable mobile device. Each mobile device 106 coupled to network 104 may be the same or different (i.e. mobile devices 106 need not all be the same type of device). Each mobile device may include some or all of the components described below in conjunction with FIG. 5.

Developers 110 can use the low-code environment 102 to develop mobile applications, which can be deployed and executed upon the mobile devices 106. Such applications include transactional applications, i.e. applications that enable users to add, view, update, and delete records stored within a shared database 128. Multiple users of an application can operate on a single record concurrently. In addition, transactional applications developed using the low-code environment 102 allow for offline operation, meaning a user can add, change, and delete records on a mobile device 106 at times when there is no connectivity between the mobile device 106 and the database 128. To reduce (and ideally minimize or even eliminate) the risk of data loss, information about pending user changes can be persisted on the mobile device 106. Subsequently, after appropriate connectivity is established, either directly or indirectly, between a mobile device and the database, pending changes on the mobile device can be synchronized with the database 128 via an application server 121. In some embodiments, the system 100 may provide transactional semantics and conflict detection capabilities to maintain data integrity.

Within the system 100, mobile applications can be defined in terms of pages. An application may include one or more pages, and a page may include an arbitrary number of UI elements (e.g., user controls) and client-side scripting instructions (e.g., JavaScript). The UI elements and/or JavaScript may be defined with reusable components referred to herein as "UX components" (or more simply "components"). In some embodiments, UX components can be included by reference within a page. In various embodiments, pages and UX components may be implemented using Hypertext Markup Language (HTML), Cascading Style Sheets (CS S), and/or JavaScript. For example, a page may include a top-level HTML document along with JS and CSS, whereas a component may include additional HTML, JS, and/or CSS that is injected into the page.

The illustrative low-code environment 102 includes a UX builder 108, UX component definitions (or more simply "component definitions") 112, page definitions 116, database adapters 114, a page renderer 118, and assets 120. The UX builder 108 includes visual interfaces that allow a developer 100 to build transactional applications by arranging and configuring controls within pages. Within the low-code environment 102, components and pages may be represented by component definitions 112 and page definitions 116, respectively. The component and page definitions 112, 116 may be stored to non-volatile memory, such as a conventional hard disk drive (HDD). In various embodiments, the component definitions 112 and/or page definitions 116 may be stored as files within a file system accessible to the UX builder 108, the page renderer 118, and various other components of the low-code environment 102.

The component definitions 112 and page definitions 116 can include server-side scripting instructions (or, more simply, "server-side instructions"), which can be executed by the low-code environment 102 (more specifically the page renderer 118) before the corresponding page is served to a mobile device 106. The server-side instructions may be written in any suitable scripting/interpreted language, such as) (Basic, PHP, or the like. The server-side scripting instructions may generate content that can be dynamically injected into a page.

A page definition 116 can include component definitions 112 by reference. Such references may be resolved when the page is rendered, by evaluating the component definitions and injecting the resulting content within the page. In addition, UX components may be customized on a per-page basis. For example, a page definition 116 that includes a component definition by reference can customize its look and feel by overriding default CSS styles used by the component. Likewise, a developer 110 can use server-side and/or client-side scripting within the page definition 116 to customize a component.

In addition to accessing the component and page definitions 112, 116, the UX builder 108 can also access data or metadata within the database 128 for rendering its visual interfaces and/or generating page definitions 116. For example, if the database 128 is provided as a relational database, the UX builder 108 may query the database 128 to determine which tables are available to an application and the data definition for those tables (e.g., column names, column data types, etc.). This may be possible because the low-code environment 102 can be used both to develop and deploy applications. In some embodiments, the production database schema may be available to the UX builder 108.

The assets 120 may include images, audio content, video content, CSS, JavaScript, and/or any other content used within an application. Assets may be referenced by a page definition 116 and/or a UX component definition 112 and loaded by a mobile device 106 after a corresponding application launches.

As mentioned above, a developer 110 can use the UX builder 108 to build applications using visual interfaces. In some embodiments, a developer can use the visual interfaces to construct pages, select UX components to include on a given page, and customize the pages and components. In various embodiments, the UX builder 108 may present a list of available components to the user by querying the component definitions 112. In such embodiments, the UX builder 108 may generate page definitions 116 as output. In certain embodiments, a developer 110 can also use the UX builder 108 to build reusable UX components, in which case the UX builder 108 may generate component definitions 112 as output. The UX builder 108 can be used to modify an existing components and pages by editing corresponding component and page definitions, respectively, according to the same embodiments.

Within transactional applications, it may be common to provide UI elements for presenting and operating on database records. Components that include such UI elements are referred to herein as "model-based components." When building/editing a page having a model-based component, the UX builder 108 may allow the developer 110 to configure various data source properties used by the component. Non-limiting examples of data source properties include a database connection string, a table name, and a field list. In addition, the UX builder 108 may allow a developer to specify default search criteria used to retrieve a default set of rows and fields from database 128 for populating the model-based component. Alternatively, the developer 110 may decide that the model-based component should not be automatically populated, instead requiring a user to provide search criteria (e.g., to load database records relevant to that user).

In some embodiments, component definitions 112 may include a UX component having a list control to present a plurality of database records to a user and to allow the user to select individual records for editing or deleting. The UX builder 108 may allow the developer to specify one or more database table names as the data source for a list control, and map associated column names to fields of the list control. An illustrative UI for customizing a list control is discussed below in conjunction with FIG. 3C.

The page renderer 118 may convert UX component definitions 112 and/or page definitions 116 into content that can be displayed, executed, or otherwise utilized by a mobile device 106. In one mode, the page renderer 118 generates rendered content based upon a specified page definition 116 and component definitions 112 referenced therein. In another mode, the page renderer 118 generates a rendered UX component from a specified component definition 112. When evaluating component and page definitions, the page renderer 118 may execute any server-side scripting instructions included therein (e.g., to set initial values for controls). Server-side scripting can also be used to handle Ajax callbacks from the component. Such callbacks can be used for any suitable purpose, including but not limited to: data validation; data transformation; conflict detection; and create, read, update, and delete (CRUD) operations.

The page renderer 118 can be invoked in two different contexts: with or without user session information. In the first case, the rendered content may be customized for a specific session, user, and/or device. In the second case, the rendered content (referred to herein as pre-rendered content 124) generally includes no session, user, or device-specific information and thus can be shared across mobile devices 106. In addition, a mobile device 106 can store pre-rendered pages to non-volatile memory to allow mobile applications to startup in offline mode. Pre-rendered content 124 can be generated in an "offline" manner and persisted to disk. In some embodiments, the UX builder 108 includes a menu option the developer 110 can use to generate pre-rendered content 124. In some embodiments, the UX builder 108 uses a similar technique to enable the developer to preview an application before it is deployed. In some embodiments, pre-rendered content 124 conforms to the HTML5 "ApplicationCache" standard to allow a HTML5-enabled mobile device 106 to cache the application.

The low-code environment 102 can use a standardized naming convention when generating HTML, CSS, and JavaScript content. In particular, the IDs of HTML elements serve as the connection between the HTML and auto-generated JavaScript and CSS, and can be used by the developer 110 within custom JavaScript/CSS. The IDs are assigned when the page is rendered using a convention that ensures uniqueness within the DOM, while being easily understandable to the developer 110. The low-code environment 102 may include server-side and client-side libraries to simplify access and manipulation to DOM elements (i.e., without requiring knowledge of particular element IDs).

In various embodiments, the component definitions 112 and/or page definitions 116 are stored as text files (e.g., ASCII or UTF-8 encoded files) accessible to the developer 110. Accordingly, the developer 110 could develop portions of the transactional application using a conventional text editor in addition to, or in place of, using the UX builder 108.

It will be understood that there are many common forms of data storage used in business, including simple file-based storage (e.g., "flat files"); file-based database systems such as Microsoft Access and SQLite; client-server relational database management systems (RDBMs) such as Microsoft SQLServer, MySQL, Oracle, DB2, and the like; and web services accessed through a HTTP-based protocol such as REST. In general, different data storage mechanisms provide different capabilities and, thus, have different programming interfaces. Even two RDBMs both purporting to support a common version of SQL will generally be incompatible in some respects.

In some embodiments, the low-code environment 102 can utilize various types of databases 128 for storing shared application data. To provide uniform data access within the low-code environment 102, one or more database adapters 114 may be provided. A particular database adapter 114 may include any suitable combination of software and/or hardware to interact with a particular type of database 128 and implement a uniform Application Programming Interface (API) usable by various other components of the low-code environment 102. The API could include, for example, commands to read and write data records from the database using primary keys. In various embodiments, the low-code environment 102 supports a so-called "Portable SQL" syntax to provide database-independent, standardized SQL syntax that is translated into a database-specific SQL dialect supported by the database 128.

Some business applications define relationships between database entities. For example, in a so-called "parent-child" relationship, a parent entity "has" one or more children and a child "belongs to" one or more parents. In a relational database, tables (i.e., entities) may be related by one or more fields. One way to represent parent-child entities is using a hierarchical structure, wherein child records are represented as attributes of a corresponding parent record.

In some embodiments, the system 100 may use hierarchical structures within the mobile application and/or for synchronization data between the application server 121 and the mobile device 106. In such embodiments, the mobile application need not be aware of the underlying database schema. In the case of client-to-server synchronization, using a hierarchical structure may allow the application server to provide transactional semantics. For example, in the case where the database 128 is table-based, synchronizing a given data record and its child records may require updating multiple database rows and/or multiple database tables. Using the hierarchical structure, the application server 121 can provide transactional semantics, such that either all of the parent/child rows are updated, or none of them are. In other words, if any update to a child row fails, the application server 121 could ensure that any updates to corresponding parent and sibling records would not be performed (or would be rolled back if necessary).

TABLE 1 shows an example of a hierarchical data structure that could be used within the system 100. In this example, it is assumed that the database 128 includes a "customers" entity, an "orders" entity, and an "order details" entity related as follows: a customer can have zero or more orders, and an order has one or more order details. TABLE 1 illustrates a corresponding hierarchical structure that could be used to load customer records, along with their order records, to a mobile device 106. In this example, a customer with id "31" has two orders: the first order has order number "10" and includes two order detail records; the second order has order number "23" and includes one order detail record. In this example, the hierarchical structure is encoded using JavaScript Object Notation (JSON), which can be conveniently processed using JavaScript. In some embodiments, the hierarchical structure of TABLE 1 is used within a list control.

TABLE 1

Hierarchical Structure Example

```
{
  "CUSTOMER_ID": "31",
  "FIRSTNAME": "Dean",
  "LASTNAME": "McDonald",
  "BILL_CITY": "North Oxford",
  "BILL_STATE_REGION": "MA",
  "_primaryKey": "31",
  "_a5crc": -429214,
  "_LIST_LISTORDERS": [
    {
      "order_number": "10",
      "discount": "0",
      "customer_id": "31",
      "sales_rep": "Ito",
      "pay_method": "MCard",
      "_primaryKey": "10",
      "*key": 0,
      "*renderIndex": 0,
      "*value": "10",
      "_LIST_LISTORDERDETAILS" : [
        {
          "part_number" : "P100",
          "quantity" : "3"
        },
        {
          "part_number" : "P123",
          "quantity" : "13"
        }
      ]
    },
    {
      "order_number": "23",
      "discount": "0",
      "customer_id": "31",
      "sales_rep": "Johnson",
      "pay_method": "Cash",
      "_primaryKey": "23",
      "*key": 1,
      "*renderIndex": 1,
      "*value": "23",
```

TABLE 1-continued

Hierarchical Structure Example

```
"_LIST_LISTORDERDETAILS" : [
    {
        "part_number" : "P300",
        "quantity" : "43"
    }
    ]
  }
],
"*key": 28,
"*renderIndex": 28,
"*value": "31"
}
```

In various embodiments, the low-code environment 102 may include a data conversion module 130 to convert data from a structure used by the database 128 to a hierarchal structure, and vice-versa.

A problem with database synchronization, particularly within unreliable network environments, is write conflicts. A write conflict can occur when, between the time a first user downloads and modifies a particular record (or a field thereof) and the time that the change is synchronized, a second user causes that same record/field to change within the database. The first user is likely unaware of the second user's change, and therefore, the first user's changes cannot be "safely" applied to the database (i.e., doing so could inadvertently overwrite the second user's change).

Accordingly, the low-code environment 102 may include a conflict detection module 132 for detecting and handling write conflicts. In general, the conflict detection module 132 may be configured to detect and handle conflicts according to a conflict detection policy. To detect conflicts, the module 132 may compare values within the database against "old" values sent by the mobile device 106. More specifically, if a user changes a field of particular record, the mobile device 106 would send the previous value of that field (i.e., the value last sent from the server) along with the new value entered by the user. The conflict detection module 132 compares the "old" value against the value in the database, finding a conflict if they do not match. In various embodiments, the conflict detection policy comprises rejecting the change and returning information to the mobile device 106 to enable the user to resolve the conflict. Another conflict detection policy is to "ignore" the write conflict and accept the conflicting change into the database. A developer 110 could also implement a custom conflict detection using server-side event handling, as described further below.

As mentioned above, the low-code environment 102 can be used, not only to develop transactional applications, but also to deploy such applications. In this context, the term "deploy" means to deliver (e.g., serve or install) initial application content to a mobile device 106 and to process subsequent requests for data and/or additional content from the application. Application content can be served from the application server 121 or installed as a native app, either via an app store or "side loaded."

In some embodiments, the application server 121 includes a content controller 122 to serve application content (either pre-rendered content or dynamically rendered content) and a data controller 126 to serve application data. In certain embodiments, the application server 121 may include a router to route requests to the appropriate controller using, for example, URL endpoint information.

The content controller 122 may be configured to handle requests for application content, such as pages, components, and assets 120. The content controller 122 may utilize the page renderer 118 to generate rendered page/component content, as needed.

For example, if a mobile device 106 requests an initial page representing a mobile application and subsequently requests UX components used within the application, the content controller 122 may handle both types of requests, invoking the page renderer 118 as needed. In some embodiments, the content controller 122 can serve pre-rendered content 124, which may be explicitly requested by a mobile device 106. For example, an HTML5-enabled mobile device may request pre-rendered content that implements the "ApplicationCache" interface, enabling the device to cache the application content.

The data controller 126 may process various data requests from a mobile device 106 (or an application executing thereupon), including both server-to-client and client-to-server data synchronization requests.

When processing a server-to-client data synchronization request, the data controller 126 may perform one or more database queries (via database adapter 114) to retrieve rows and fields from one or more tables containing the requested data. In some embodiments, the data controller 126 may perform a separate query for each table. In other embodiments, the data controller 126 may query multiple tables at once using a SQL "JOIN" statement or the like. The data controller 126 may convert the query results (e.g., rows) into a hierarchical structure (e.g., a composite JSON object) using the data conversion module 130, and returns the hierarchical data to the mobile device 106.

When processing a client-to-server data synchronization request, the data controller 126 may convert hierarchical data within the request into one or more database write statements (e.g., SQL "INSERT," "UPDATE," and/or "DELETE" statements) using the data conversion module 130, and execute those statements against the database 128 using a corresponding database adapter 114. Records may be stored to the database in a "top-down" fashion. For new records, the data controller 126 first adds parent records to the database, updates children records to include a reference to the newly added parent record (e.g., the parent record's primary key), and then adds the child record to the database. For table-based databases, a single data record may be split across multiple tables; the data conversion module 130 handles this case by generating multiple write statements for a single record. In various embodiments, the data controller 126 may provide transactional semantics, such that no parent record is updated if any of its children records cannot be updated. In some embodiments, the data controller 126 may detect and handle write conflicts using the data detection module 132.

In some embodiments, the low-code environment 102 may be adapted for use in a production environment to serve previously developed mobile applications. Thus, for example, the UX builder 108 may be excluded in certain embodiments.

In certain embodiments, the low-code environment is provided as a service (commonly referred to as "Software as a Service," or "SaaS"). Thus, for example, the developer 110 could interact with the UX builder remotely over the Internet via web-based interfaces. In other embodiments, the low-code environment 102 is provided as a desktop application.

Figure 2:
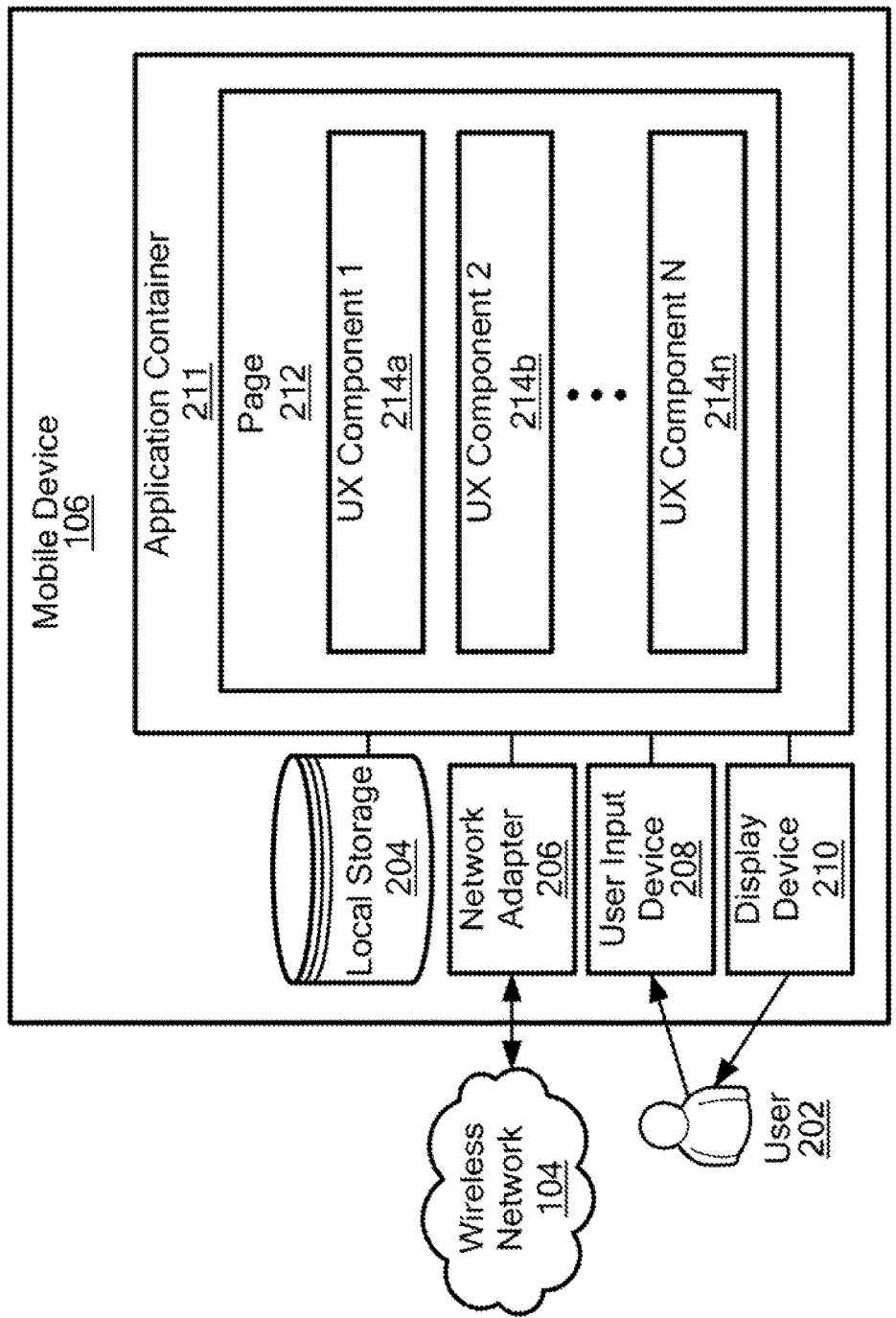
FIG. 2 is a block diagram of a mobile device for use with the system of FIG. 1.

Referring to FIG. 2, in which like elements of FIG. 1 are shown having like reference designations, an illustrative mobile device 106 may include a local storage device 204, a network adapter 206, one or more user input devices 208, and a display device 210. A user 202 can interact with the mobile device 106 using the input and display devices 208, 210. Non-limiting examples of user input devices include keyboards, mice, touch screens, microphones, cameras, motion sensors, and other sensors found on conventional mobile devices. The network adapter 206 may provide connectivity between the mobile device 106 and an unreliable wireless network 104 and, thus, between the mobile device 106 and the low-code environment 102 (FIG. 1). The local storage device 206 may correspond to any suitable non-volatile storage mechanism capable of storing and retrieving application data. In various embodiments, the local storage device 206 may be provided as a hardware-based storage device (e.g., Flash memory) and provides an API that the mobile applications generated using the low-code environment 102 can use to store and retrieve application data. In some embodiments, the local storage device 206 may implement the standard HTML5 "local Storage" JavaScript interface. The local storage device 206 can be used to store application content (e.g., content that implements the HTML5 "ApplicationCache" interface and/or application data).

The mobile device 106 may include an application container 211 capable of running transactional applications developed using and deployed by the low-code environment 102. The application container 211 may be operatively coupled to the user input devices 208 and the display device 210, passing user input from the user input device 208 to the application and application output to the display device 210.

In various embodiments, the application may comprise one or more HTML pages. In such embodiments, the application container 211 may correspond to a standalone mobile web browser (e.g., Safari on iOS, or Chrome on Android) and/or a web browser component/object within a native application (e.g., the "UIWebView" component on iOS or the "WebView" object on Android).

In other embodiments, the application container 211 may correspond to a native application, such as an iOS app developed using Objective-C/Swift or an Android app developed using Java. Such apps can be installed by a user via an app store, or installed using a "side loading" technique. It will be appreciated that toolkits are available for generating native mobile applications based on pre-rendered web content. For example, PhoneGap from Adobe Systems can be used to "wrap" web content in a native iOS/Android application. Thus, a developer 110 (FIG. 1) can use the low-code environment in conjunction with such a toolkit to build native mobile applications without having to write line-by-line code. More particularly, the developer 110 could use the low-code environment 102 to generate pre-rendered content 124, and then invoke such a toolkit to generate a native mobile application that can deployed on a mobile device 106. It will be appreciated that, whereas web browsers may provide application data storage facilities (e.g., "localStorage") that is relatively limited in terms of storage space and/or functionality, native applications may have access to additional data storage facilities, such as file system access or SQLLite. In the case of a native application, the local storage device 204 may correspond to such a "native" data storage facility.

At startup, the application container 211 may load an initial page from the application server 212 or, more particularly, from the content controller 122. Alternatively, the application container 211 could load a pre-rendered page 124 (FIG. 1) previously cached on the device (e.g., within the local storage device 204), thus allowing the application to startup in offline mode.

A page 212 may include one or more UI elements (e.g., user controls) that may be defined in terms of one or more UX components 214. The systems and techniques described herein can be used to develop and deploy applications having generally any number of pages and UI elements. In this example, the application includes a single page 212 and a plurality of UX components 214a-214n. An illustrative UX component 214 is shown in detail in FIG. 2A and described below in conjunction therewith.

Figure 2A:
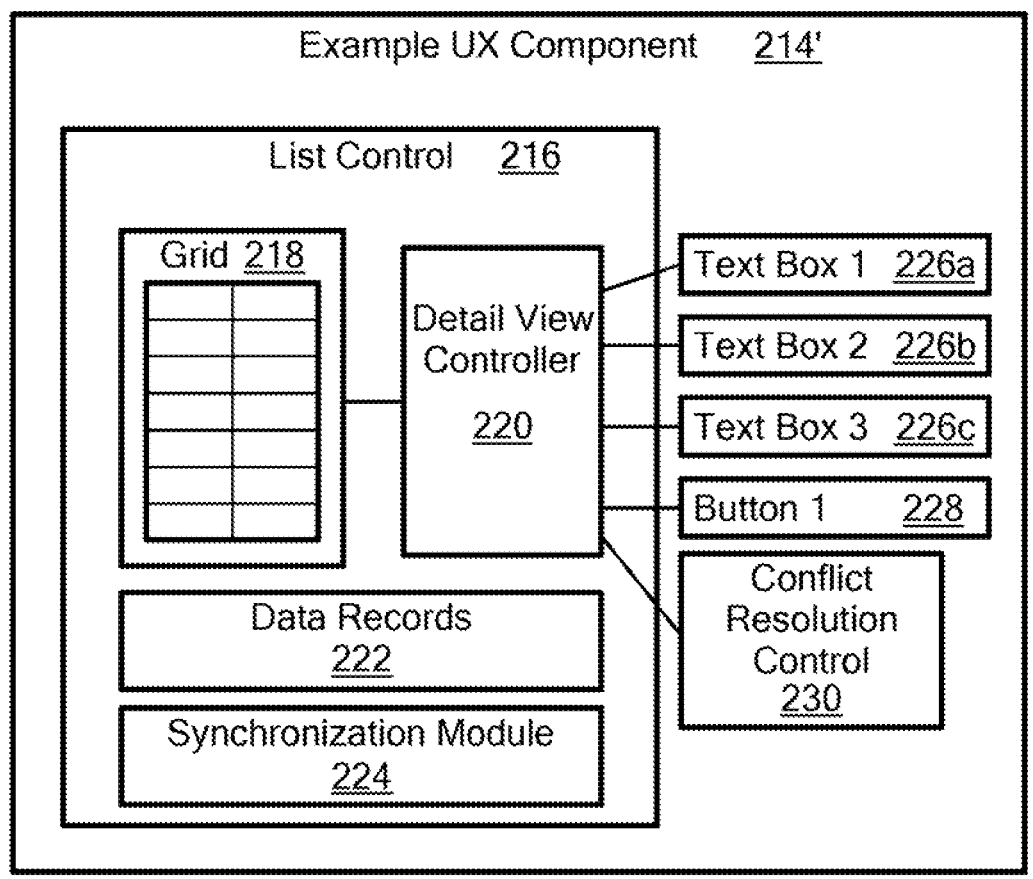
FIG. 2A is a diagram of an illustrative user experience (UX) component for use within the mobile device of FIG. 2.

Referring to FIG. 2A, an illustrative UX component 214', which may be the same as or similar to a UX component 214 of FIG. 2, includes a list control 216 comprising a grid 218, a detail view controller 220, data records 222, and a synchronization module 224, as shown. The synchronization module 224 may be configured to handle server-to-client and client-to-server synchronization of the data records 222 with the application server. The grid 218 can be used to display the data records 222 (i.e., certain fields thereof) and to enable a user to select data records for editing or detailed viewing. In some embodiments, the grid 218 uses a table-based layout wherein rows of the table correspond to data records and column of the table correspond to attributes/fields thereof. The detail view controller 220 may be coupled to one or more controls by which the user can view and/or edit selected records. In this example, the detail view controller 220 is coupled to text boxes 226a, 226, a button 228, and a conflict resolution control 230. Individual controls can be mapped to data record fields. For example, the text box 226a may be mapped to a field, allowing the user to view and edit that field for selected data records. If the user selects a record within the grid 218, the detail view controller 220 may detect such action and update the controls 226-230 accordingly. Likewise, if the user edits a data record via text boxes 226, the detail view controller 220 may detect this action and update the grid 218 and data records 222 accordingly. The list control 216 may be further configured to enable the user to add new records and to delete existing records.

In some embodiments, the grid 218 may include various types of status indicators associated with the data records. For example, the grid 218 may indicate to the user 202 which records have been changed locally but not yet synchronized with the shared database 128 (FIG. 1).

As described above, the UX builder 108 may allow a developer to assign various data source properties to a list control 216, including default search criteria. In addition, the grid 218 may include various controls via which the user can specify the search criteria. For example, the grid 218 may include a filter input (e.g., a search box) and per-column sort controls. Using these controls, the user can load a "relevant" data set into the list control. If and when the mobile device 106 goes offline, the user 202 can view and edit data records from this data set.

The contents of the list control 216 (i.e., the data records 222) may be cached within the local storage device 204 so that, in the event the application is subsequently started in offline mode, the user 202 can view and edit the list data. Likewise, any user-defined search criteria could also be cached in the local storage device 204. In general, the local storage device 204 can be used to save any application state.

The list control 216 may be configured to store user changes to the local storage device 204 until they have been synchronized to the database 128 (FIG. 1). Specifically, if a user adds a new record, the list control 216 may store the value of all fields entered by the user. If the user deletes a record, the list control 216 may mark the record as deleted (e.g., by adding the attribute "is_deleted=true"). If the user edits a record, the list control 216 may store the record's primary key, along with the old and new values for any fields changed by the user. As discussed above in conjunction with the conflict detection module 132 of FIG. 1, storing both the old and new values allows the application server 121 (FIG. 1) to detect write conflicts. Pending user changes may be stored in JSON format, and changes to related data records may be stored together using a hierarchical structure.

The sync module 224 may be responsible for synchronizing pending user changes from the mobile device 106 to the database 128 via the application server 126 (referred to as "client-to-server" synchronization"). The sync module 224 can include any suitable combination of hardware and/or software to identify pending user changes, to transmit pending changes to the application server 121 (FIG. 1) using the network adapter 206, and to handle corresponding responses from the application server 121. In various embodiments, the sync module 224 may include JavaScript code generated by the low-code environment 102.

Client-to-server synchronization may occur based upon a policy (referred to herein as the "sync policy"), which may be defined by the developer using the UX builder 108. According to one sync policy, the sync module 224 may attempt to synchronize a user change immediately (or as soon as possible) after it is saved/committed by the user (e.g., via controls 226-230). If the mobile device 106 is offline, the change could be synchronized when connectivity is established. According to another sync policy, synchronization must be explicitly requested, such as via an API command. The list control 216 may include a "synchronize" button that, when clicked/tapped by the user, invokes the API command and/or the developer 110 could invoke the API command via custom client-side script. In various embodiments, pending user changes are stored within the local storage device 204 until the mobile device 106 receives confirmation that they were successfully synchronized to the database 128.

It will be appreciated that the user can make multiple edits, and potentially a very large number of edits, between successive synchronizations. The sync module 224 can employ different strategies for transmitting pending user changes to the application server. According to one strategy, the sync module 224 sends one sync request comprising all pending changes. According to another strategy, the sync module 224 sends a separate sync request for each pending user change. According to yet another strategy, the sync module 224 batches pending changes into multiple messages for sending. Batching can limit network usage in the event a user edits a large number of records. The batch size may be configured by the developer 110 using the UX builder 108. In some embodiments, the list control includes a synchronization progress display (e.g., a progress bar) to show the progress of ongoing synchronizations. The list control 216 may also include a "cancel" button that the user can click/tap to stop additional data from being synchronized.

A user can interact with the conflict resolution control 230 to resolve write conflicts detected by the application server 121 (FIG. 1). The conflict resolution control 230 may provide the user control over how to handle a write conflict, presenting the user with detailed information about the conflict to help them decide. As shown in FIG. 4C, the conflict resolution control 230 may be coupled to the detail view controller 220, which presents the control 230 in the context of a particular data record field that caused the write conflict. In certain embodiments, the user is presented with options to accept their own changes ("use mine") or the remote user's changes ("use theirs"). If the user chooses to accept their own changes, the pending user change is modified to set the "old" value to the remote user's value. A subsequent synchronization should succeed (assuming no additional conflicts) because the server-side conflict detection module 132 (FIG. 1) will determine the "old" value matches the current database value. If the user chooses to accept the remote user's changes, the pending user change can simply be disregarded and the grid 218 and/or controls 226-230 can be updated to reflect the remote user's change.

It will be appreciated that the low-code environment 102 (FIG. 1) generates server-side and client-side code that works together to detect write conflicts and to give a user 202 control over how to resolve those conflicts. In addition, the generated code includes various event triggers (both client-side and server-side), allowing a developer 110 to define custom event handlers. For example, the server-side conflict detection module 132 (FIG. 1) would generate an event when a conflict is detected; the developer 110 could add custom server-side instructions (e.g.,)(Basic) to handle this event for implementing a custom conflict resolution policy. As another example, the client-side conflict resolution control 230 would generate an event when it receives a write conflict notification from the application server 121; the developer could add custom client-side instructions (e.g., JavaScript) to handle this event for customizing the user experience.

The sync module 224 may also be responsible for server-to-client data synchronization. As with client-to-server synchronization, server-to-client synchronization may occur based on a policy (referred to herein as a "refresh policy"), which can be defined by the developer using the UX builder 108. According to one refresh policy, the sync module 224 performs server-to-client data synchronization following a client-to-server synchronization. According to another refresh policy, synchronization must be explicitly requested, such as via an API command. In some embodiments, the list control 216 may include a refresh button that, when clicked/tapped by a user, invokes the API command and/or the developer 110 could invoke the API command via custom client-side script.

In certain embodiments, the sync module 224 may support two types of client-to-server synchronization (or "refresh"): full and incremental. An incremental refresh differs from a full refresh in that only records that have been edited or added within the database 128 since the last refresh are sent to the mobile device 106, along with unique identifiers (e.g., primary keys) for any records that were deleted.

An incremental refresh can be triggered at any time (e.g., using an API command provided within the sync module 224), however generally a full refresh can generally only be performed if there are no pending user changes. In some embodiments, the list control 216 may include a button the user can press to cause an incremental refresh. When performing an incremental refresh, the sync module 224 may send checksums for each data record stored at the client to the application server 121, which compares those checksums to the database to determine which records should be sent to the client.

When a server-to-client sync takes place, any filters applied to the list control prior to the synchronization may be given effect after the synchronization. For example, assume that at the start of his day, while still at the office where a connection is available, a user 202 enters a search to retrieve all customer records for customers located in Lexington, Mass. The filter "City='Lexington' and State='MA'" would be associated with the list control 216 and stored to local storage 204 as such. Assume also that the UX includes list controls for related (i.e., "child") customer orders and order details. Later in the day, when the device 106 is connected to the application server 121, the user 202 initiates an incremental refresh by clicking/tapping a button. A server-to-client sync may be performed and all of the records on the server for customers in Lexington, Mass. that have been edited since the user 202 executed the initial search may be sent to the client to update the list controls on the mobile device 106. The response to the device 106 may include all edits made to any orders for the selected customers, or any order details for any order for the selected customers. The application can automatically update the customers, orders, and order details list controls accordingly.

Figures 3A, 3B:
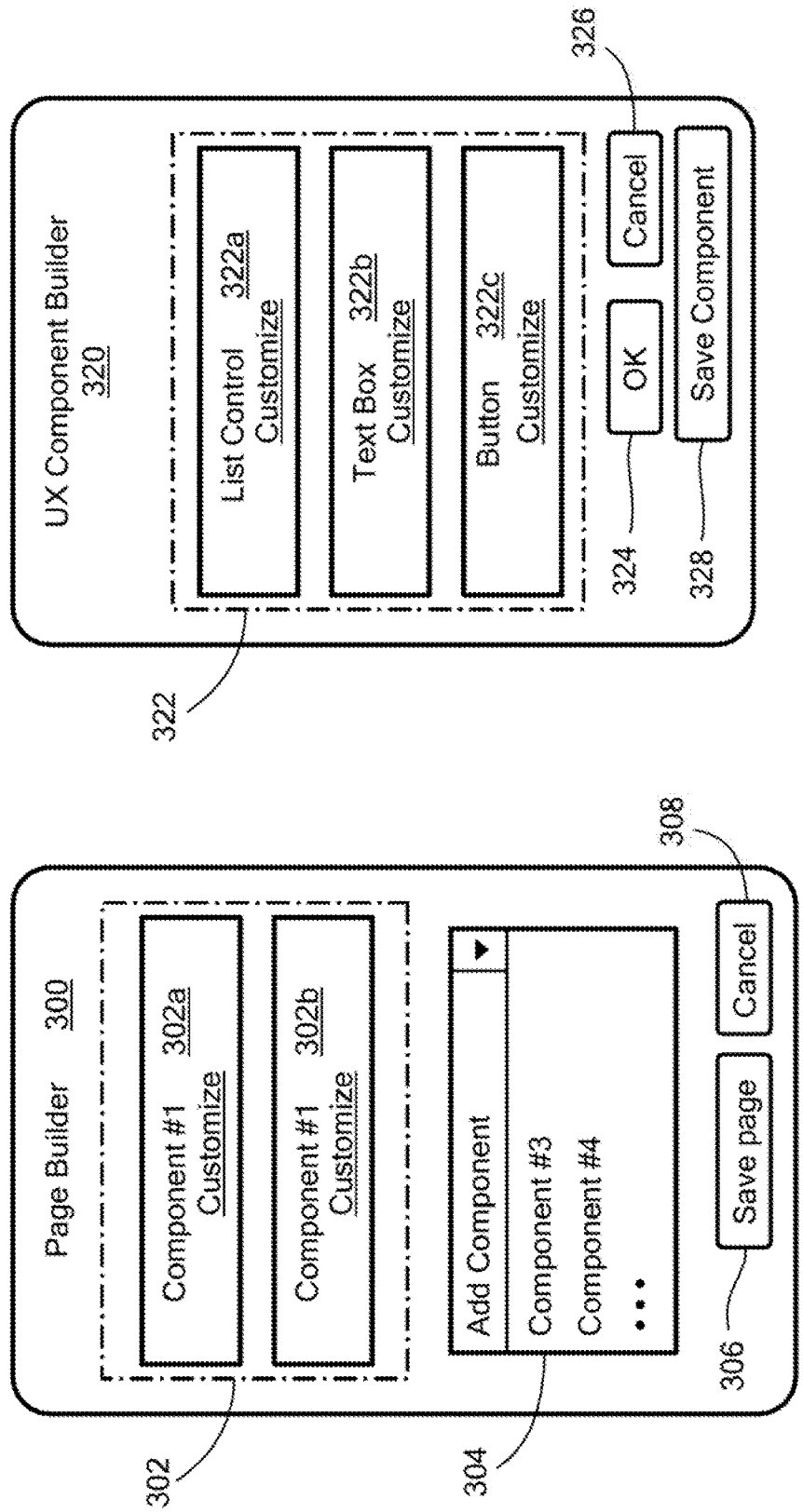
FIGS. 3A-3C are diagrams of illustrative user interfaces (UI) for use within the low-code environment of FIG. 1.
Figure 3C:
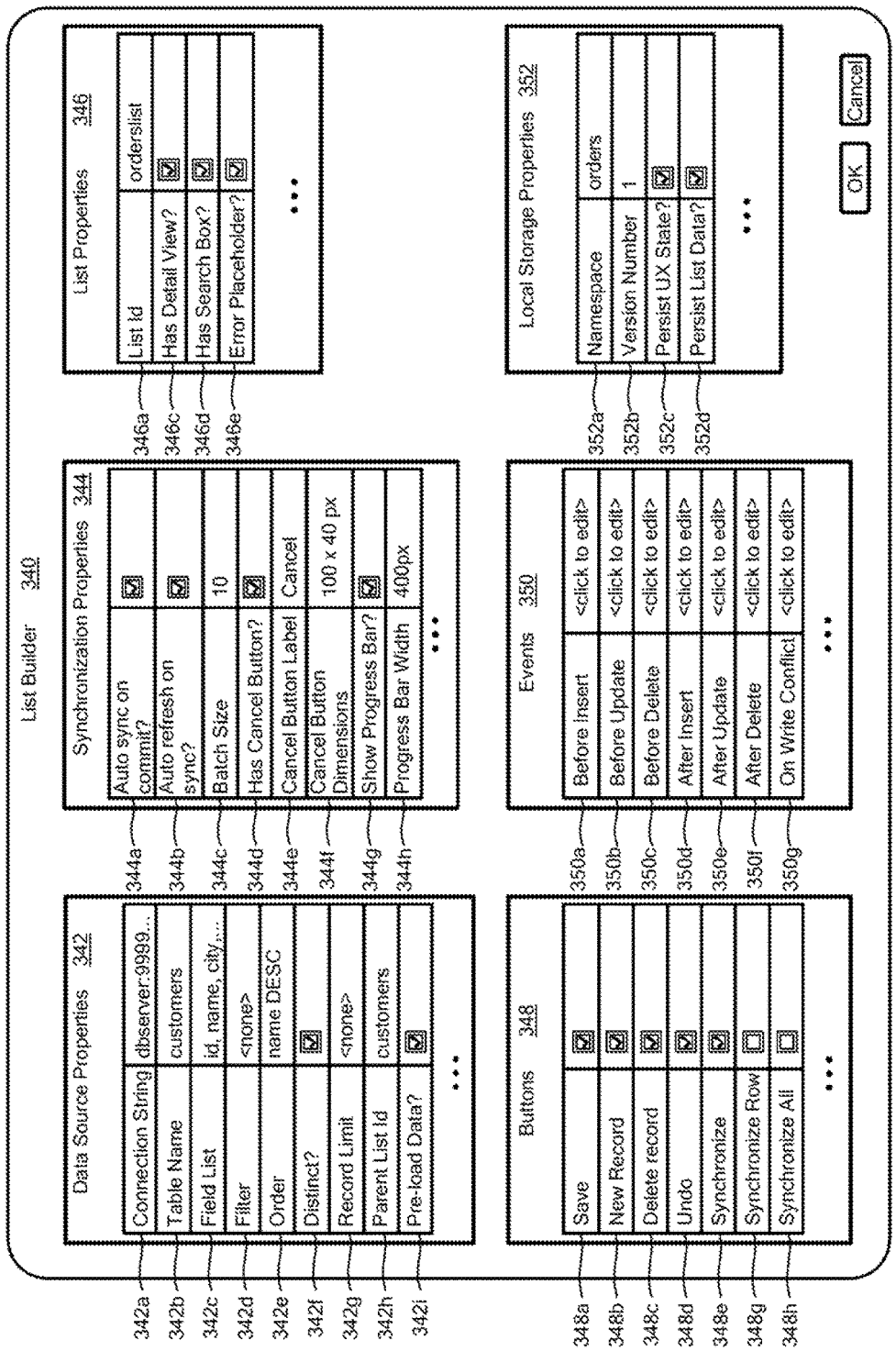

FIGS. 3A-3C show illustrative UIs 300 for use within the UX builder 108 of FIG. 1. Referring to FIG. 3A, a developer 110 may use an illustrative page builder 300 to generate and/or edit page definitions 116. The page builder 300 may include a list of UX components 302 already included within the page and a library 304 of UX components that can be added to the page. The library 304 may comprise a drop-down list, as shown, and may be populated by querying the UX component definitions 112 (FIG. 1). In this example, the page includes two UX components ("Component #1" 302a and "Component #2" 302b) and the library 304 includes two additional UX components ("Component #3" and "Component #4"). A link is provided along with each of the included UX components 302 (the links are labeled as "Customize" in FIG. 3A) to activate a component builder 320 (FIG. 3B) for customizing the respective component. The illustrative page builder 300 also includes a save button 306 and a cancel button 308. Clicking the save button 306 causes the page to be persisted as a page definition 116.

Referring to FIG. 3B, the component builder 320 shows controls 322 included within the selected component. In this example, the selected component may correspond to either of the components 302a, 302b included within the page of FIG. 3A, and includes a list control 322a, a text box 322b, and a button 322c. A link may be provided along with each of the controls 322 (the links are labeled as "Customize" in FIG. 3B) to activate a suitable UI for customizing the respective control (e.g., the list builder 340 of FIG. 3C). The illustrative component builder 320 may also include a confirmation button 324, a cancel button 326, and a save component button 328. In some embodiments, the confirmation button 324 and/or the cancel button 326 may return the developer 110 to the page builder 300 of FIG. 3A, where on the developer can persist the component changes in the context of a page definition 116 using the button 306. Clicking the save component button 328 may cause the component to be saved as a component definition 112. Thus, the component builder 320 can be used to develop cross-application reusable components, in addition to customizing a given component within an application. Each of the elements 322 may have a unique id associated with it (not shown), which can be used as its HTML element id and in corresponding, generated JavaScript and CSS.

Referring to FIG. 3C, the illustrative list builder 340 can be used by a developer 110 to configure a list control (e.g., list control 322a of FIG. 3B) using familiar, graphical controls, such as checkboxes, drop-down lists, and text inputs. The various properties shown in FIG. 3C and described herein are merely non-limiting examples of properties that could be included in a list builder. For brevity of explanation, only certain properties are described herein below.

Illustrative data source properties 342 include connection string 342a, table name 342b, and field list 342c properties can be used to associate the list control with a database 128 (FIG. 1), a table within that database, and columns within that table, respectively. The table name 342b can list multiple table names, indicating that a single data record includes fields from multiple tables; the low-code environment automatically handles joining the multiple tables on a read and updating the multiple tables on a write. Filter 342d, order 342e, distinct 342f, and record limit 342g properties correspond to the default search criteria for the list (i.e., the search criteria used to select the default data set at startup). If a relational database is used, the field list 342c, filter 342d, and order 342e properties may include portions of an SQL statement, such as "SELECT," "WHERE," and "ORDER BY" clauses, respectively. In various embodiments, the UX builder 108 provides a "query genie" interface to simplify the generation of database statements/clauses. The query genie may open when a developer clicks on certain properties, such as the filter property 342d. Alternatively, the developer could choose to enter database statements/clause directly using "Portable SQL" described above.

A parent list id property 342h can be used to define hierarchical relationships between list controls. For example, referring to FIG. 3B, a developer 110 may set the parent list id 342h for the Order Details list control 322c to the unique id of the Orders list control 322b, and the parent list id 342h for the Orders list control 322b to the unique id for the Customers list control 322a. This parent-child relationship information can be used by the data conversion module 130 of FIG. 1 to convert database columns/rows to a hierarchical structure, and vice-versa.

In certain embodiments, the list builder 340 may also enable the developer to configure a conflict policy on a per-field basis. For example, the list builder 340 may include a checkbox labeled "Ignore write conflicts?" for each field in the field list 342c. If the checked, a later-in-time change to the corresponding database field overwrites an earlier-in-time change to the same field.

The synchronization properties 344 can be used to configure visual and functional aspects of data synchronization for the list control. The list builder 340 may allow the developer to set synchronization policies. Using property 344a, the developer can specify that every time a user commits (or "saves") changes, those changes should be synchronized with the server as soon as possible (e.g., immediately or when connectively is established). Using property 344b, the developer can also specify that every time a client-to-server synchronization is performed that a server-to-client synchronization should be performed. The batch size property 344c may be used to determine whether the sync module 224 batches pending user changes; a blank or zero value may indicate that batching should not be used.

The list properties 346 may include additional properties for configuring a list control. For example, the developer can change the unique id for the list control using the list id property 346a and can show/hide various default UI elements using the properties 346c-346e. In various embodiments, the developer could alternately specify HTML element ids for certain custom UI elements, such as the error placeholder 346e. Property 346d determines whether a search box should be included in the list control (e.g., list control 216 FIG. 2A). Using properties 346d and 342i, the developer can configure the list control such that the user 202 must explicitly perform a search to populate the list data.

In some embodiments, the list builder 340 may allow a developer to determine which buttons should be included within the generated list control. For example, the illustrative button properties 348a-348g may be provided. In various embodiments, the developer could alternately specify HTML element ids for custom buttons. TABLE 2 provides an explanation of various buttons that may be available within the default list control, and associated default actions. As described above, a developer can override default actions by defining custom event handlers.

TABLE 2

| BUTTON | DEFAULT ACTION |
| --- | --- |
| Save | Save edits made to a record back to the list. |
| New Record | Start editing a new record. Default values for a new record are filled into the corresponding controls. |
| Delete Record | Marks the selected record in the list as deleted. |
| Undo Edits | Undo edits made in to a record (before the edits have been saved back to the list). |
| Undo Row Edits | Undo the edits made to the selected list row. |
| Synchronize | Causes a client-to-server sync for the current list control. |
| Synchronize Current Row | Causes a client-to-server sync for the current row. |
| Synchronize All | Triggers a client-to-server sync for all list controls (e.g., all lists in a hierarchy). |
| Refresh List Data - Incremental | Causes an incremental refresh of the list data. Server is queried to find records that have been edited since the list was initially populated. Only edited and new records are sent to the browser. Rows in the list that have been edited are not updated. |
| Refresh List Data | Causes a refresh of all of the data in the list. Can only be used if there are no pending user changes. |

To simplify event handling, the list builder 340 may further include event properties 350 for defining custom event handling for a variety of relevant events, such as illustrative events 350a-350g. Separate properties 350 may be provided to define client-side events and server-side events. The developer can enter any valid, executable script, e.g., JavaScript for client-side event handling and/or XBasic for server-side event handling. For example, the developer could define custom client-side and/or server-side event handlers for custom validation, conflict detection, write policy, etc.

The list builder 340 may also include local storage properties 352 used by the list control 216 to store and retrieve data in a local storage device 204 (FIG. 2). For example, the developer can specify a namespace 352a and a version number 352b. The version number may be stored along with list data. When the list data is subsequently retrieved, the version number can be used to determine compatibility between the list data and the running application. In some embodiments, the list control 216 may use the version number 325b to implement data migration routines to migrate data from an incompatible format to a compatible format. In certain embodiments, the developer can choose whether the UX state is persisted and restored at application startup using the property 352c. In some embodiments, the developer can choose whether the list data is persisted and restored at startup using the property 352d.

Figure 4A:
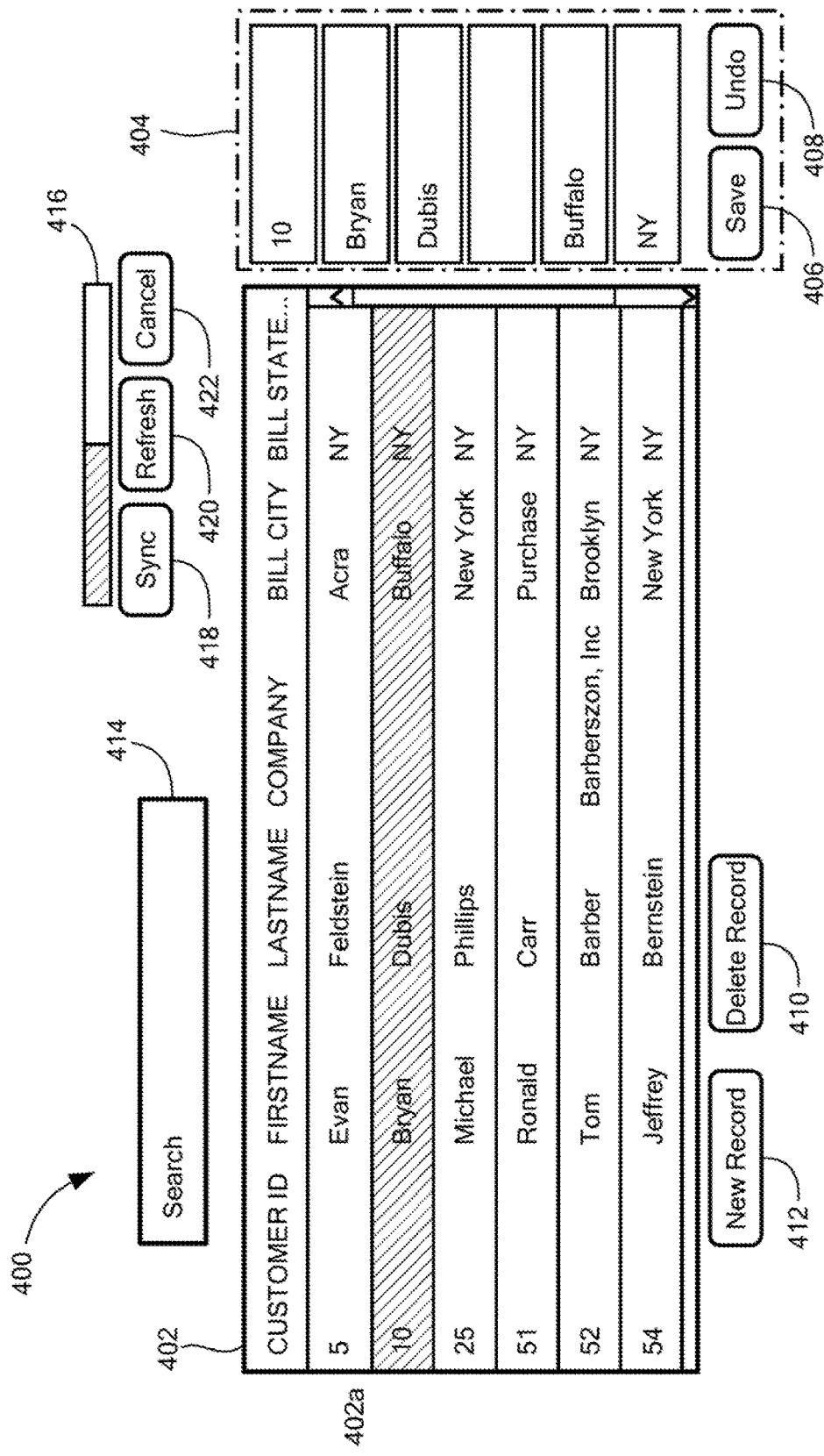
Figure 4C:
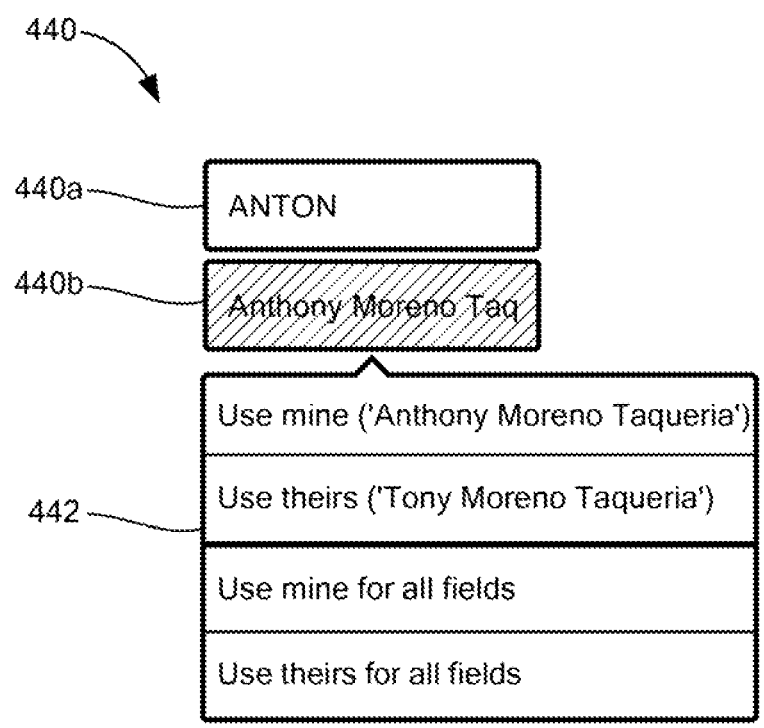

FIGS. 4A-4C illustrate a transactional application that may be generated by a low-code environment (e.g., low-code environment 102 of FIG. 1) and executed upon a mobile device (e.g., a mobile device 106 of FIG. 1). The application may include UI elements defined in terms of UX components, as described above.

Referring to FIG. 4A, an illustrative application 400 may include a grid 402, text boxes 404, a save button 406, an undo button 408, a delete record button 410, and a new record button 412. A user can select a row 402a within the grid 402 and the corresponding data record is displayed using text boxes 404, whereby each text box 404 may be mapped to a data record field. Using the text boxes 404, the user can edit fields of the record. The user can click/tap the save button 406 to commit the changes or click/tap the undo button 408 to revert the changes. When a row 402a is selected, the user may also click/tap the delete button 410 to remove the corresponding record from the list. The user may click/tap the new record button 412 to add records to the list.

In some embodiments, the application 400 may also include a search box 414 by which the user can enter a filter. In certain embodiments, the application 400 may also include a progress bar 416 to show the progress of in-progress synchronizations (or pending synchronizations in batch mode), a sync button 418 which the user can click/tap to cause a client-to-server sync, a refresh button 420 which the user can click/tap to cause a server-to-client sync, and/or a cancel button 322 to cancel pending synchronizations in batch mode. The set of available buttons may be configured using the list builder button properties 348 shown in FIG. 3C.

Referring to FIG. 4B, an illustrative grid 430 may be the same as or similar to the grid 402 of FIG. 4A. The grid 430 may include various row status indicators that provide the user information about the state of the list data, which can be particularly helpful in an unreliable wireless network environment. For example, the grid 430 may utilize the following types of status indicators: status indicator 432 identifies records that have been changed locally but not yet synchronized to the shared database 128 (i.e., rows associated with pending user changes); status indicator 434 identifies records that have been added locally but not yet added to the shared database 128; and status indicator 436 identifies records that could not be synchronized due to an error detected by the application server 121. If the user selects a row that could not be synchronized (e.g., row 430a in FIG. 4B), a contextual error message may be displayed. In some embodiments, the placement of the error message is determined by a list builder property (e.g., property 346e of FIG. 3C).

FIG. 4C shows an illustrative conflict resolution control 442 which can be used, for example, within the application 400 of FIG. 4A. The conflict resolution control 442 may enable a user to resolve write conflicts interactively. As shown, the conflict resolution control 442 may be presented in association with a UI element, such a text box 440, mapped to a data record field. In this example, two text boxes 440a, 440b are shown, which could correspond to the text boxes 404 of FIG. 4A. Fields that are in conflict with a remote user's changes are highlighted, such as the field corresponding to text box 440b in this example. The user can click/tap on the control for a conflicted field to activate the conflict resolution control 442, which may be the same as or similar to conflict resolution control 230 of FIG. 2A. The conflict resolution control 442 includes a plurality of choices, which the user can click/tap to resolve a conflict. The choices can include using the local change ("use mine") or using the remote change ("use theirs"). In various embodiments, the values entered by the local and remote users are shown. As with all other aspects of the transactional application, the developer 110 can customize the look and behavior of the conflict resolution control 442.

It will be appreciated that the systems and techniques described herein use a deferred updating method does not need a separate local database, and all of the operation is part of the application. The application can be built with knowledge of the main database, and the server-side code that it communicates with can be built to know about the particular application. Status information determined on the server (such as data validation or collision information) can be tailored for sending back to the client, and the client code that communicates with the server can be integrated with the UI of the client application to appropriately display that status information and let the user act upon it as they determine. The low-code environment 102 makes developing and deploying such applications relatively easy, automatically building the code to manage data records on the device, manage connectivity and synchronization issues, data validation, write conflicts, etc.

Figure 5:
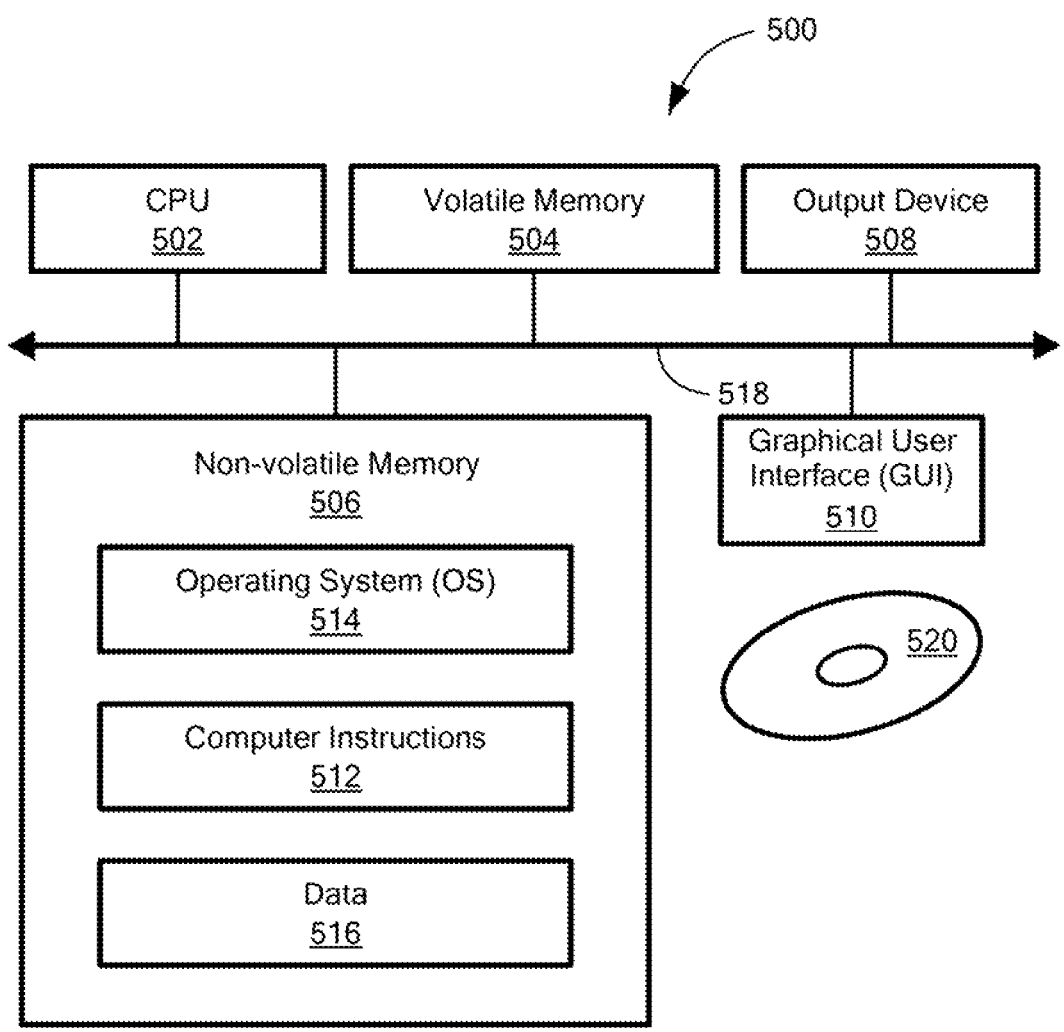
FIG. 5 is a schematic representation of an illustrative computer for use with the systems of FIGS. 1 and 2.

FIG. 5 shows an illustrative computer or other processing device 500 that can perform at least part of the processing described herein. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504. In one embodiment, an article 520 comprises non-transitory computer-readable instructions. In some embodiments, the computer 500 is configured to provide web-based services accessible via the Internet (i.e., SaaS).

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A system for transactional applications in an unreliable wireless network environment, the system including a low-code environment comprising:
   a user experience (UX) component builder to enable a developer to generate a stored page configuration, the stored page configuration including a data source and synchronization policy; and
   an application server configured to:
      in response to receiving a synchronization request from a mobile device, the synchronization request comprising first user changes, compare the first user changes to data within a database to detect a write conflict with second user changes, and return information about the write conflict and the second user changes to the mobile device; and
      in response to receiving a content request from the mobile device, render a page using the stored page configuration and return the rendered page to the mobile device, the rendered page comprising:
         a list view to display a plurality of data records and to enable a first user to select a data record from the plurality of data records;
         a detail view to display the selected data record to the first user, to enable the first user to change fields of the selected data record, and to store the first user changes to a local storage device upon the mobile device;
         a synchronization module to send a synchronization request to the application server according to the synchronization policy, the synchronization request including the first user changes, and to receive the information about the write conflict and the second user changes; and
         a conflict resolution control integrated into the detail view to provide to the first user options for resolving the write conflict, the options include an option to accept the first user changes and an option to accept the second user changes, wherein in response to the first user selecting the option to accept the first user changes, the first user changes are subsequently committed to the database.

2. The system of claim 1 further including:
   a mobile device coupled to the application server via an unreliable wireless network, the mobile device comprising:
      a wireless network adapter;
      a display device to display;

a user input device;
a local storage device; and
an application container operatively coupled to the wireless network adapter, the display device, the user input device, and the local storage device, the application container to send a content request to the application server to request the rendered page, the application container to display the rendered page via the display device.

3. The system of claim 1 wherein the first user changes includes old values and new values for the changed fields, wherein the conflict detection module compares the old values to data within the database to detect a write conflict.

4. The system of claim 1 wherein the database comprises a relational database, wherein the data source comprises a table name and column names within the relational database.

5. The system of claim 4 wherein the first user changes comprise hierarchical data, wherein in response to receiving the synchronization request from a mobile device, the application server converts the hierarchical data to relational data.

6. The system of claim 1 wherein:
the stored page configuration further includes a refresh policy;
the application server is further configured to, in response to receiving a refresh request from the mobile device, the refresh request comprising a plurality of checksums, retrieve updated data records from the database using the plurality of checksums, and send the updated data records to the mobile device; and
the synchronization module is further configured to send the refresh request to the application server according to the refresh policy, the refresh request including the plurality of checksums, and to update the list view based upon the updated data records.

7. The system of claim 6 wherein:
the stored page configuration further includes a default search criteria; and
the application server retrieves the updated data records further using the default search criteria.

8. The system of claim 1:
wherein the stored page configuration further includes a conflict resolution policy; and
wherein, in response to receiving the synchronization request from a mobile device, the application server detects the write conflict based upon the conflict resolution policy.

9. The system of claim 1:
wherein the low-code environment further comprises a tool to store the rendered page to non-volatile memory as a pre-rendered page; and
wherein, in response to receiving a pre-rendered content request from the mobile device, the application server returns the pre-rendered page to the mobile device.

10. The system of claim 1 wherein the stored page configuration includes server-side scripting instructions, and wherein, in response to receiving the content request from the mobile device, the application server evaluates the server-side scripting instructions.

11. A system for transactional applications in an unreliable wireless network environment, the system including a low-code environment comprising:
a user experience (UX) component builder configured to:
present available components to a developer;
enable the developer to select a component from the available components, the selected component comprising a list control;
enable the developer to configure a data source and a synchronization policy for the list control;
generate a page definition using at least the selected component, data source, and synchronization policy; and
store the page definition to non-volatile memory; and
an application server configured to:
in response to receiving a synchronization request from a mobile device, the synchronization request comprising first user changes, compare the first user changes to data within a database to detect a write conflict with second user changes, and return information about the write conflict and the second user changes to the mobile device; and
in response to receiving a content request from the mobile device, render a page using the stored page configuration and return the rendered page to the mobile device, the rendered page comprising:
a list view to display a plurality of data records and to enable a first user to select a data record from the plurality of data records;
a detail view to display the selected data record to the first user, to enable the first user to change fields of the selected data record, and to store the first user changes to a local storage device upon the mobile device;
a synchronization module to send a synchronization request to the application server according to the synchronization policy, the synchronization request including the first user changes, and to receive the information about the write conflict and the second user changes; and
a conflict resolution control integrated into the detail view to provide to the first user options for resolving the write conflict, the options include an option to accept the first user changes and an option to accept the second user changes, wherein in response to the first user selecting the option to accept the first user changes, the first user changes are subsequently committed to the database.

12. The system of claim 11 further including an unreliable wireless network coupled between the mobile device and the application server.

13. The system of claim 12 wherein the mobile device comprises:
a wireless network adapter;
a display device to display;
a user input device;
the local storage device; and
an application container operatively coupled to the wireless network adapter, the display device, the user input device, and the local storage device, the application container to send a content request to the application server to request the rendered page, the application container to display the rendered page to the first user via the display device.

14. The system of claim 11 wherein the first user changes includes old values and new values for the changed fields, wherein the conflict detection module compares the old values to data within the database to detect a write conflict.

15. The system of claim 11 wherein:
the database comprises a relational database; and
the data source comprises a table name and column names within the relational database.

16. The system of claim 15 wherein:
the first user changes comprise hierarchical data, and in response to receiving the synchronization request from a mobile device, the application server converts the hierarchical data to relational data.

17. The system of claim 16 wherein the UX component builder is further configured to:
    enable the developer to configure a refresh policy for the list control; and
    generate the page definitions using the refresh policy.

18. The system of claim 17 wherein the application server is further configured to:
    in response to receiving a refresh request from the mobile device, the refresh request comprising a last refresh time, retrieve updated data records from the database using the last refresh time, and send the updated data records to the mobile device.

19. The system of claim 18 wherein the synchronization module is further configured to:
    send a refresh request to the application server according to a refresh policy, the refresh request including a last refresh time; and
    to update a list view based upon the updated data records.

20. The system of claim 19 wherein:
    the UX component builder is further configured to: (1) enable the developer to configure default search criteria for the list control, and (2) further generate a page definition using default search criteria; and
    the application server retrieves the updated data records further using the default search criteria.

21. The system of claim 11 wherein:
    the low-code environment further comprises a tool to store the rendered page to non-volatile memory as a pre-rendered page; and
    in response to receiving a pre-rendered content request from the mobile device, the application server returns the pre-rendered page to the mobile device.

22. The system of claim 11 wherein the stored page configuration includes server-side scripting commands, and wherein, in response to receiving the content request from the mobile device, the application server evaluates the server-side scripting commands.

23. A system for transactional applications in an unreliable wireless network environment, the system including a low-code environment comprising:
    a user experience (UX) component builder configured to:
        present available components to a developer;
        enable the developer to select a component from the available components, the selected component comprising a list control;
        enable the developer to configure a data source and a synchronization policy for the list control;
        generate a page definition using at least the selected component, data source, and synchronization policy; and
        store the page definition to non-volatile memory; and
    an application server configured to:
        in response to receiving a synchronization request from a mobile device, the synchronization request comprising first user changes, compare the first user changes to data within a database to detect a write conflict with second user changes, and return information about the write conflict and the second user changes to the mobile device; and
    a toolkit to generate a native mobile application using the stored page configuration, the native mobile application operable to run on the mobile device and including a user interface (UI) comprising:
        a list view to display a plurality of data records and to enable a first user to select a data record from the plurality of data records;
        a detail view to display the selected data record to the first user, to enable the first user to change fields of the selected data record, and to store the first user changes to a local storage device upon the mobile device;
        a synchronization module to send a synchronization request to the application server according to the synchronization policy, the synchronization request including the first user changes, and to receive the information about the write conflict and the second user changes; and
        a conflict resolution control integrated into the detail view to provide to the first user options for resolving the write conflict, the options include an option to accept the first user changes and an option to accept the second user changes, wherein in response to the first user selecting the option to accept the first user changes, the first user changes are subsequently committed to the database.

* * * * *